(12) United States Patent
Ilg

(10) Patent No.: US 8,061,785 B2
(45) Date of Patent: Nov. 22, 2011

(54) HUB DEVICE FOR DISC BRAKE, BRAKE DISC, AND VEHICLE

(75) Inventor: Torvald Ilg, Enskede (SE)

(73) Assignee: Scania CV AB (SE)

( * ) Notice: Subject to any disclaimer, the term of this patent is extended or adjusted under 35 U.S.C. 154(b) by 131 days.

(21) Appl. No.: 12/441,554

(22) PCT Filed: Aug. 31, 2007

(86) PCT No.: PCT/SE2007/050605
§ 371 (c)(1),
(2), (4) Date: Mar. 17, 2009

(87) PCT Pub. No.: WO2008/036033
PCT Pub. Date: Mar. 27, 2008

(65) Prior Publication Data
US 2010/0084911 A1 Apr. 8, 2010

(30) Foreign Application Priority Data
Sep. 19, 2006 (SE) ........................................ 0601955

(51) Int. Cl.
*B60B 27/00* (2006.01)
*F16D 65/12* (2006.01)

(52) U.S. Cl. ..................... 301/105.1; 301/6.8; 188/18 A; 188/218 XL

(58) Field of Classification Search ................... 301/6.1, 301/6.3, 6.8, 105.1; 188/17, 18 A, 18 R, 188/218 XL, 71.6, 264 R
See application file for complete search history.

(56) References Cited

U.S. PATENT DOCUMENTS

| 5,507,367 A * | 4/1996 | Dagh et al. ................... 188/18 A |
| 6,446,765 B1 | 9/2002 | Dabertrand et al. |
| 6,467,588 B1 * | 10/2002 | Baumgartner et al. . 188/218 XL |
| 6,564,912 B1 * | 5/2003 | Koschinat ............... 188/218 XL |
| 6,880,682 B2 * | 4/2005 | Gotti et al. ............. 188/218 XL |
| 2004/0178031 A1 | 9/2004 | Gotti et al. ..................... 188/218 |

FOREIGN PATENT DOCUMENTS

| DE | 19726674 A1 | 1/1998 |
| DE | 19642166 A1 | 4/1998 |
| DE | 197 51 522 | 5/1999 |

(Continued)

OTHER PUBLICATIONS

International Search Report dated Jan. 28, 2008, issued in corresponding international application No. PCT/SE2007/050605.

(Continued)

*Primary Examiner* — Kip T Kotter

(74) *Attorney, Agent, or Firm* — Ostrolenk Faber LLP

(57) ABSTRACT

A hub device for a disc brake, fastened by a fastening portion to a vehicle wheel. A number of external ridges (splines) hold the brake disc in the circumferential direction of the hub. The brake has in it a central hole with grooves running axially for cooperation with the ridges. The ridges each have a portion protruding away from the fastening portion and forming a gap between them and the outer shell surface of a portion (which points away from the fastening portion) of a bearing socket (which is supported by the fastening portion) of the hub device. The protruding portions are adapted to support a brake disc. The invention also relates to a brake disc and a vehicle having the device.

16 Claims, 5 Drawing Sheets

FOREIGN PATENT DOCUMENTS

| | | |
|---|---|---|
| DE | 10233141 A1 | 2/2004 |
| JP | 7-507378 | 8/1995 |
| JP | 2001-132784 | 5/2001 |
| JP | 2004-526906 | 9/2004 |
| JP | 2006-038025 | 2/2006 |
| JP | 2007-062502 | 3/2007 |
| WO | WO 93/14947 | 8/1993 |
| WO | WO 9314946 A1 | 8/1993 |
| WO | WO 9324761 A1 | 12/1993 |
| WO | WO 0063575 A1 | 10/2000 |
| WO | WO 0192751 A1 | 12/2001 |
| WO | WO 0201088 A1 | 1/2002 |
| WO | WO 03002886 A1 | 1/2003 |
| WO | WO 03045712 A1 | 6/2006 |
| WO | WO 2006129327 A1 | 12/2006 |

OTHER PUBLICATIONS

European Search Report mailed Mar. 14, 2011 in corresponding European Patent Application No. 07 794 210.0.

English translation of Official Action mailed Jul. 12, 2011 in corresponding Japanese Application No. 2009-529155.

\* cited by examiner

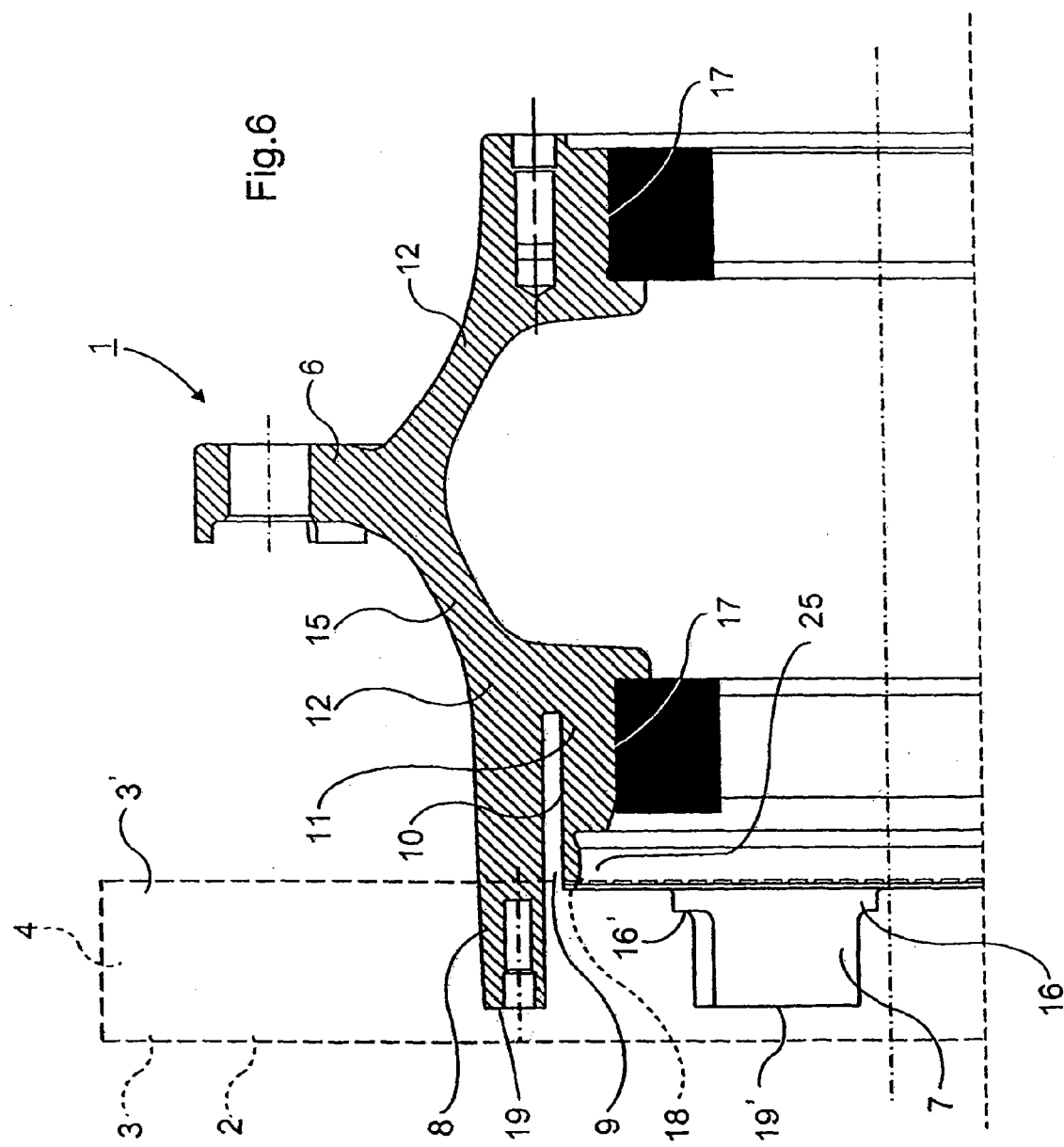

HUB DEVICE FOR DISC BRAKE, BRAKE DISC, AND VEHICLE

CROSS REFERENCE TO RELATED APPLICATION

The present application is a 35 U.S.C. §§371 national phase conversion of PCT/SE2007/050605, filed 31 Aug. 2007, which claims priority of Swedish Application No. 0601955-8, filed 19 Sep. 2006, the disclosure of which is incorporated by reference herein. The PCT International Application was published in the English language.

BACKGROUND OF THE INVENTION

The present invention relates to a hub device which cooperates with a brake disc and to features thereof.

The invention also relates to a vehicle which uses the hub device with the brake disc.

BACKGROUND

During braking, a disc brake disc becomes very warm. This results in heat being given off from the disc to the surroundings by convection, conduction and radiation, but in normal operating conditions there is a predominance of conduction, i.e. heat being conducted away from the brake disc. Since the brake disc is fixed in the wheel hub, the latter has to be so configured that its seals and bearings are not subject to high temperatures due to said conduction, which is not normally a problem in the case of a traditional hub and a traditional brake disc, in which the neck of the disc is firmly screwed centrally to the hub.

A so-called splined disc, i.e. a brake disc with no neck, however, is fastened close to an end of the hub by splines of the hub. The result is an unfavourable temperature distribution in the hub, causing raised bearing temperatures. This is of course undesirable and affects bearing service life etc.

OBJECT OF THE INVENTION

The object of the present invention is to provide a hub device, in which bearings and seals do not become warm to an extent as in the state of the art, resulting in a more favourable stress distribution in the hub and better cooling of the hub and hence a solution to the problems described above. Another object is that the hub device be capable of being cast integrally and therefore at relatively low cost.

SUMMARY OF THE INVENTION

The invention concerns a hub device for a disc brake, fastened by a fastening portion to a vehicle wheel. A number of external ridges (splines) hold the brake disc in the circumferential direction of the hub. The brake disc has in it a central hole with grooves running axially for cooperation with the ridges. The ridges each have a portion protruding away from the fastening portion and forming a gap between them and the outer shell surface of a portion (which points away from the fastening portion) of a bearing socket (which is supported by the fastening portion) of the hub device. The protruding portions are adapted to support a brake disc. The invention also relates to a brake disc and a vehicle having the device.

BRIEF DESCRIPTION OF THE DRAWINGS

The present invention will be better understood with reference to the following detailed description read together with the attached drawings, in which the same notations refer to the same parts throughout the various views etc. and in which

FIG. 6 depicts schematically a second embodiment of a hub device according to the invention as seen in an only partly depicted axial section.

FIG. 1 shows a hub device 1 for a brake disc 2 (see FIGS. 2 and 4) which brake disc comprises two opposite wearing layers 3, 3' on which undepicted brake blocks are intended to act retardingly and which have between them a ventilation space 4.

Figure 4:
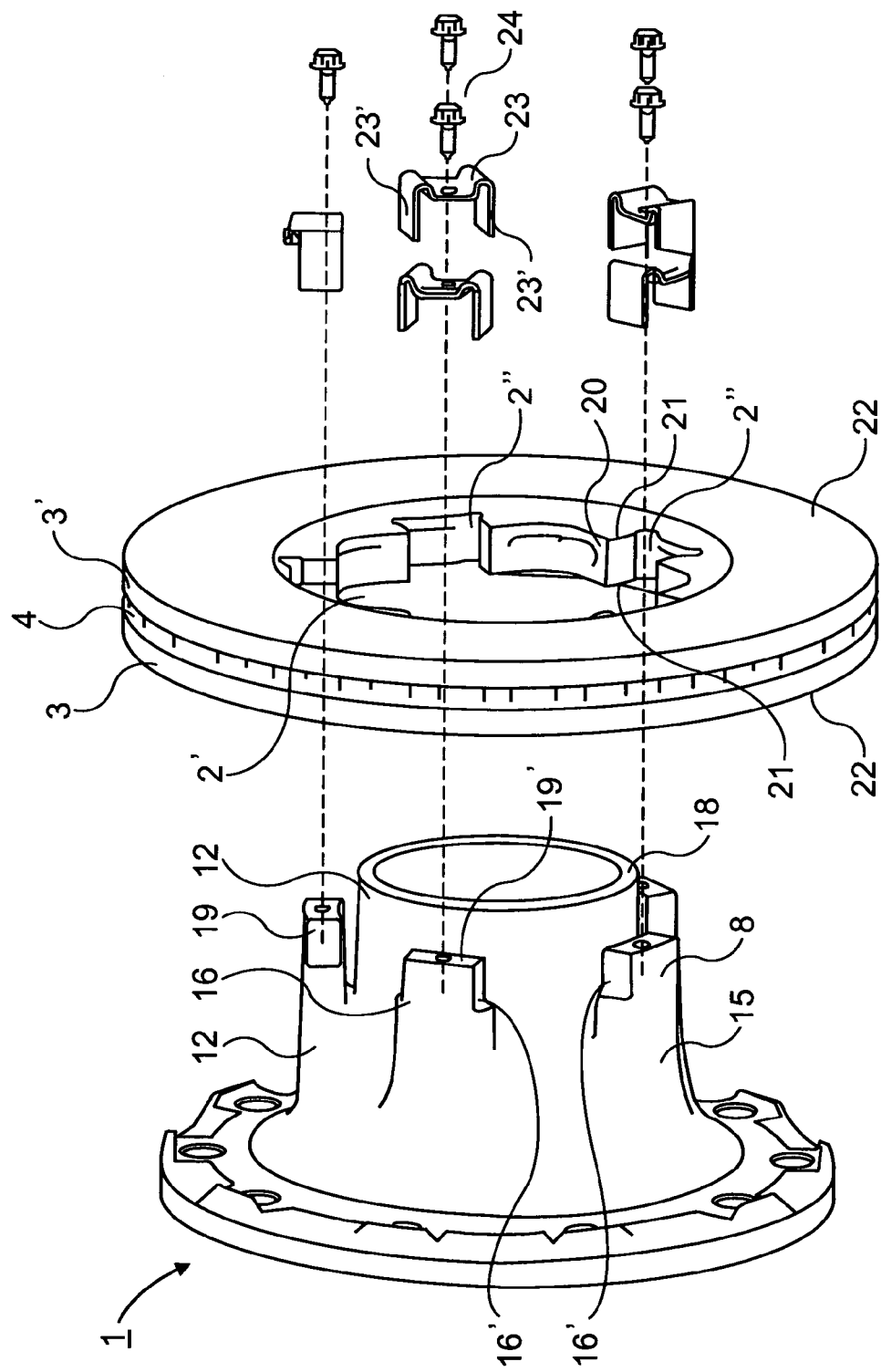
FIG. 4 depicts schematically in a perspective view the hub device according to FIG. 1 with a brake disc and assembly fittings before assembly.

The hub device comprises at its one end 5 a fastening portion 6 by which it is adapted to being fastened to an undepicted vehicle wheel. A number of ridges (splines) 7 are adapted to holding the brake disc in the circumferential direction of the hub device. The brake disc in FIG. 4 is provided with a central hole 2' with grooves 2" running axially for cooperation with the ridges.

Each ridge 7 has a portion 8 which protrudes freely and axially away from the fastening portion 6, resulting in a gap 9 between said protruding portions 8 and the outer shell surface 10 of the end 11 (which points away axially from the fastening portion 6) of a bearing socket 12 (which is supported by the fastening portion) of the hub device, which protruding portions 8 are adapted to support a brake disc 2.

Each protruding portion 8 has a substantially rectangular cross-section transverse to the axial direction of the hub device, with two mutually substantially parallel opposite side surfaces 13 running axially and substantially radially and two opposite side surfaces 14 running axially and in the circumferential direction, while the brake disc has corresponding grooves and can be applied axially to the ridges of the hub device.

It is preferable that the ridges are relatively few in number, e.g. five. According to the embodiment depicted, the freely protruding portion of each ridge is supported by a carrier portion 15 running towards and up to the fastening portion, which carrier portions run axially to the fastening portion at substantial mutual spacing in the circumferential direction and preferably join together with adjacent carrier portions at the fastening portion.

The carrier portions are so arranged that each of them protrudes in the radial direction from the bearing socket and has a radial thickness which is reduced by an internal recess 15' (see FIG. 2) and which corresponds to the radial thickness of the protruding portion.

It is preferred that the width in the circumferential direction of the carrier portions at the transition 16 to the protruding portions (see FIG. 4) exceeds the width of the protruding portions in the circumferential direction, thereby providing the carrier portions with end stops 16' for the brake disc. The width of the carrier portions preferably increases gradually towards the fastening portion, in principle from said transition.

According to the embodiment depicted (see FIG. 2) the bearing socket 12 has at least one internal bearing seat 17 within said ridges as seen in the axial direction of the hub device. It is preferred that the bearing socket has two internal seats 17, with bearings preferably in the form of taper roller bearings. The hub device is supported via the bearing/bearings on an undepicted wheel shaft. The bearing seat/seats has/have preferably substantially the same axial position as the protruding portions of the ridges. In addition to the portion with bearing seats, the bearing socket also has a portion connected to the fastening portion, thereby inter alia helping to support the carrier portions 15.

According to preferred embodiments, the hub device is cast integrally with the fastening portion, the bearing socket, the ridges and the carrier portions and is preferably made of cast iron.

Figure 2:
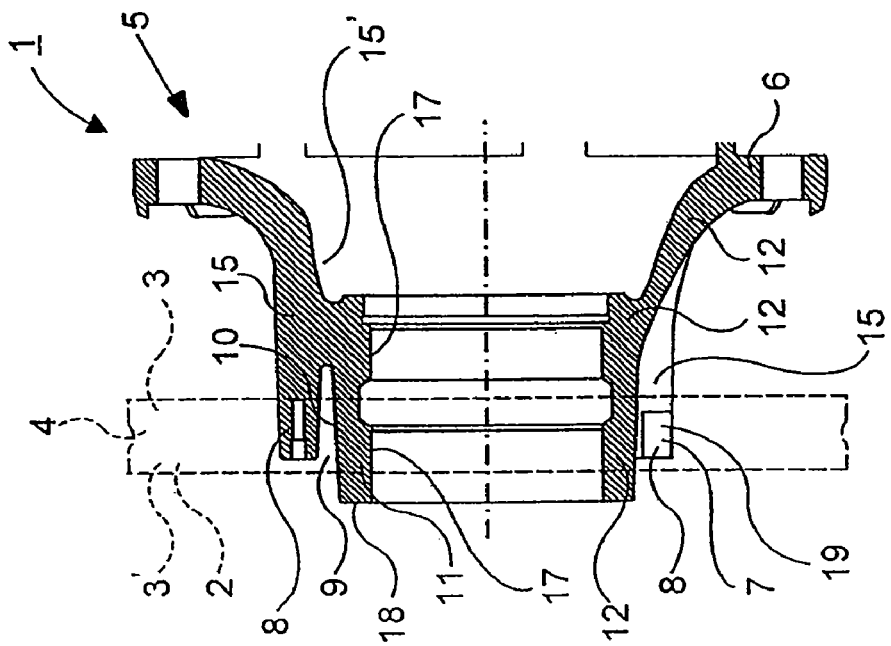
FIG. 2 depicts a section A-A according to FIG. 1, with the brake disc represented by broken lines.
Figure 1:
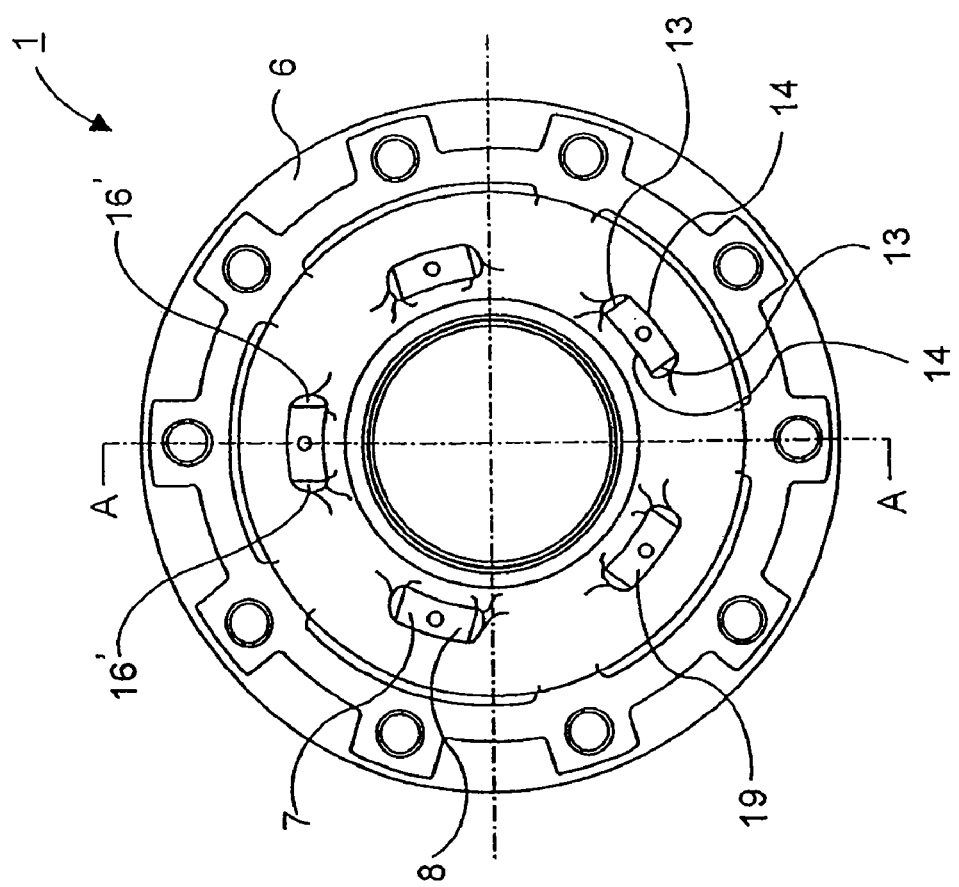
FIG. 1 depicts schematically a first embodiment of a hub device according to the invention as seen in its axial direction and in the direction in which the brake disc is intended to be applied.
Figure 3:
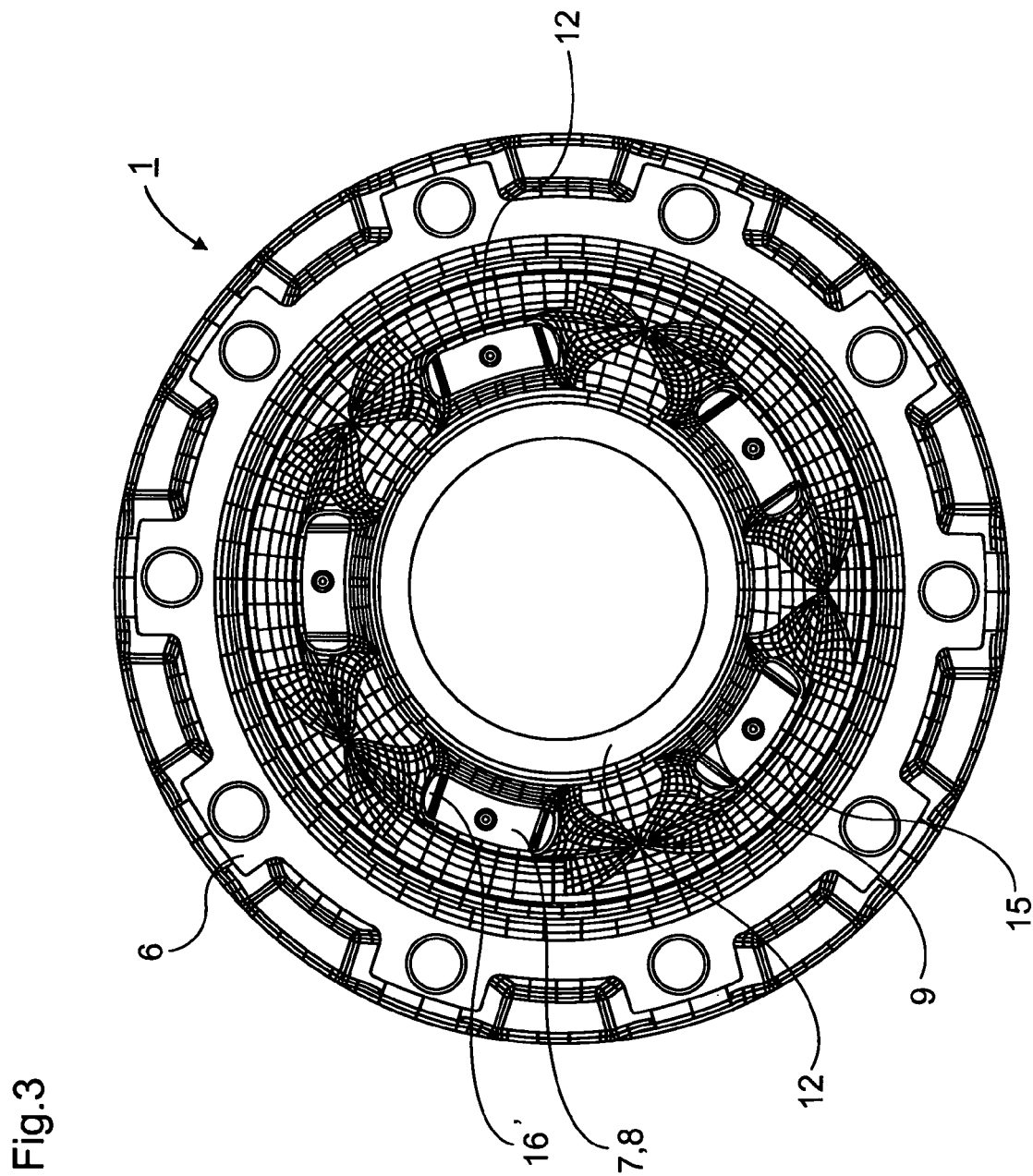
FIG. 3 depicts schematically the hub device according to FIG. 1 in a relief view.

Also according to preferred embodiments, the protruding portions 8 do not extend as far as the free end 18 of the bearing socket and they support the brake disc close to the free ends 19 of the respective portions 8. Embodiments are also preferred in which a wearing layer 3', viz. that further away from the fastening portion, is situated at least partly beyond the free ends of the protruding portions of the ridges (FIG. 2).

The brake disc according to the invention is adapted to the hub device in such a way that the number of grooves 2" corresponds to the number of ridges, i.e. five in the case depicted.

It is preferred that said grooves 2" are arranged in an internal flange 20 which runs in the circumferential direction of the brake disc (see FIG. 4) and has two opposite side surfaces 21 which in the axial direction are within the plane of the wearing surface 22 of the respective wearing layers 3, 3'. The result is that one side surface 21 of the flange 20 serves in the assembled state as an abutment surface against the endstop 16' of the respective carrier portion.

Figure 5:
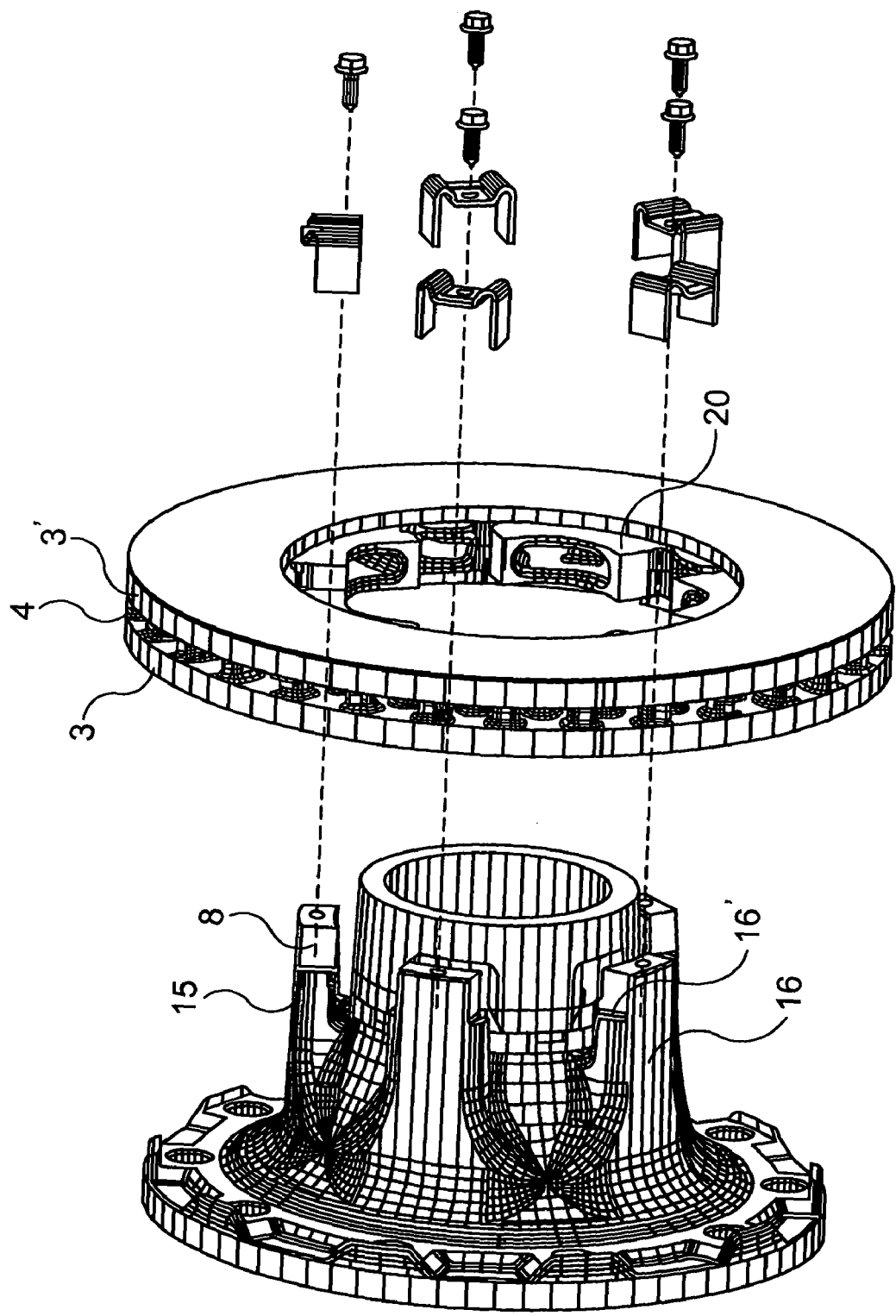
FIG. 5 depicts schematically the hub device, the brake disc and the fittings according to FIG. 4 in a relief view

According to a preferred embodiment, an assembly fitting (see FIG. 4) in the form of a stop bracket 23 is adapted to being fastened by a fastening element 24, e.g. a screw, in the end surface 19' of the free end of the respective protruding portion, as illustrated in FIGS. 4 and 5. The respective fastening bracket is adapted to having a tongue 23' protruding along each of the mutually substantially parallel side surfaces 13 (which run axially and substantially radially) of the respective protruding portion in the groove 2" which during assembly accommodates the protruding portion. The fastening bracket is preferably made of stainless steel.

The embodiment in FIGS. 1-5 is primarily intended for the front wheel disc brakes of a truck. FIG. 6 depicts another embodiment of a hub device primarily intended for the rear wheel disc brakes of a truck. In this case the fastening portion 6 is arranged centrally on the bearing socket 12, which comprises two internal bearing seats 17, a first of which is situated substantially within said ridges as seen in the axial direction of the hub device and the second is situated on the opposite side of the fastening portion from the first, as illustrated in FIG. 6. Said protruding portions also end beyond the free end 18 of the bearing socket as seen in the axial direction and support the brake disc 2 close to the free ends 19 of the respective protruding portions. Ref. 25 denotes a seal which is not specifically depicted in the first embodiment.

The function of the hub device is probably substantially and sufficiently indicated above.

Friction heat imparted to the brake disc during braking is conducted from the brake disc to the ridges. The ridges being provided with the freely protruding portions leaving a gap between them and the bearing socket results in the heat not being conducted further radially to the bearing/bearings arranged in the bearing socket within the ridges, but axially to the carrier portions while at the same time the ridges are cooled in the gap. The extent of the carrier portions in the circumferential direction provides them with a large cooling surface. The small number of ridges results in a large temperature gradient and consequently more effective air-cooling of both the hub device and the disc. An embodiment in which a wearing layer is situated at least partly outside the ridges will reduce the heat conduction from the brake disc to the hub device and facilitate air-cooling of the brake disc. The configuration of the hub device also makes it very suitable for being cast integrally.

The invention is described above in relation to preferred embodiments and embodiment examples.

Further embodiments and also minor modifications and additions are of course conceivable without departing from the basic concept of the invention.

Thus more or fewer than five ridges with freely protruding portions are conceivable, e.g. four or six.

The hub device and the brake disc are primarily intended for heavy trucks but may of course be used for other kinds of vehicles.

The invention claimed is:

1. A hub device for a disc brake, comprising:
   a hub having a fastening portion, the hub being configured and operable so that the fastening portion fastens the hub to a vehicle wheel;
   a number of external ridges or splines extending in an axial direction of the hub and configured and operable to hold a brake disc in the circumferential direction of the hub;
   the hub having a bearing socket which is supported by the fastening portion of the hub, the bearing socket having a portion which points away axially from the fastening portion, the bearing socket portion having an outer shell surface;
   the brake disc having a central hole with grooves in it running axially for cooperation with the ridges or splines;
   each ridge or spline has a protruding portion protruding freely away from the fastening portion and being shaped and positioned to form a radial gap between a free inner radial surface of the protruding portion and the outer shell surface, the protruding portions being shaped and operable to support the brake disc, the radial gap extending over the full axial extent of an overlap between the protruding portion and the outer shell surface.

2. A device according to claim 1, wherein each protruding portion has a substantially rectangular cross-section transverse to the axial direction of the hub device, including two substantially parallel opposite side surfaces running axially and substantially radially and two opposite side surfaces running axially and substantially in the circumferential direction.

3. A device according to claim 2, further comprising assembly fittings comprising fastening brackets fastened to free end surfaces of the respective protruding portions, each bracket having a tongue inserted along each of the mutually substantially parallel side surfaces which run axially and substantially radially, wherein the protruding portions are in grooves in the brake disc and the grooves accommodate the protruding portions.

4. A device according to claim 1, wherein the ridges or splines are four to six in number, and also so shaped that the ridges or splines are spaced circumferentially.

5. A device according to claim 1, further comprising a respective carrier portion supporting each freely protruding portion, each carrier portion running toward the fastening portion and running axially to the fastening portion, the carrier portions running at substantial mutual spacing in the circumferential direction and joining together at the fastening portion.

6. A device according to claim 1, wherein the bearing socket has at least one internal bearing seat substantially within the ridges or splines in the axial direction of the hub device.

7. A device according to claim 6, wherein the bearing socket has two internal bearing seats at substantially the same axial positions as the ridges or splines.

8. A device according to claim 1, wherein the protruding portions end before or beyond a free end of the bearing socket as seen in the axial direction and are operable to support the brake disc close to free ends of the respective protruding portions.

9. A device according to claim 1, wherein the hub is cast substantially integrally.

10. A device according to claim 1, further comprising the brake disc having an internal flange and grooves in the internal flange, the grooves running in the circumferential direction and are operable and positioned for receiving the protruding portions.

11. A device according to claim 10, wherein there is a respective groove corresponding to each of the ridges or splines.

12. A device according to claim 10, wherein the flange has two opposite side surfaces which in the axial direction are within a plane of respective wearing surfaces of two opposite wearing layers of the brake disc, and the side surfaces are operable during fastening of the brake disc to the hub device, as abutment surfaces for end stops forming part of the hub device.

13. A device according to claim 1, wherein the hub is cast substantially integrally and is made of cast iron.

14. A device according to claim 1, wherein the protruding portion protrudes freely away from the fastening portion in the axial direction.

15. A hub device for a disc brake, comprising:
a hub having a fastening portion, the hub being configured and operable so that the fastening portion fastens the hub to a vehicle wheel;
a number of external ridges or splines extending in an axial direction of the hub and configured and operable to hold a brake disc in the circumferential direction of the hub;
the hub having a bearing socket which is supported by the fastening portion of the hub, the bearing socket having a portion which points away axially from the fastening portion, the bearing socket portion having an outer shell surface;
the brake disc having a central hole with grooves in it running axially for cooperation with the ridges or splines;
each ridge or spline has a protruding portion protruding freely away from the fastening portion and being shaped and positioned to form a radial gap between the ridge or spline and the outer shell surface, the protruding portions being shaped and operable to support the brake disc;
the hub device further comprising a respective carrier portion supporting each freely protruding portion, each carrier portion running toward the fastening portion and running axially to the fastening portion, the carrier portions running at substantial mutual spacing in the circumferential direction and joining together at the fastening portion;
wherein the carrier portions protrude in the radial direction from the bearing socket and have a material thickness in the radial direction that is reduced by an internal recess to about the radial thickness of the respective protruding portion.

16. A hub device for a disc brake, comprising:
a hub having a fastening portion, the hub being configured and operable so that the fastening portion fastens the hub to a vehicle wheel;
a number of external ridges or splines extending in an axial direction of the hub and configured and operable to hold a brake disc in the circumferential direction of the hub;
the hub having a bearing socket which is supported by the fastening portion of the hub, the bearing socket having a portion which points away axially from the fastening portion, the bearing socket portion having an outer shell surface;
the brake disc having a central hole with grooves in it running axially for cooperation with the ridges or splines;
each ridge or spline has a protruding portion protruding freely away from the fastening portion and being shaped and positioned to form a radial gap between the ridge or spline and the outer shell surface, the protruding portions being shaped and operable to support the brake disc;
the hub device further comprising a respective carrier portion supporting each freely protruding portion, each carrier portion running toward the fastening portion and running axially to the fastening portion, the carrier portions running at substantial mutual spacing in the circumferential direction and joining together at the fastening portion;
wherein the carrier portions have a width in the circumferential direction of the carrier portions at transitions to the protruding portions which exceeds a width in the circumferential direction of the protruding portions, for providing the carrier portions with end stops for the brake disc installed on the protruding portions.

* * * * *